Nov. 29, 1966 R. A. RIGHTMIRE 3,288,641
ELECTRICAL ENERGY STORAGE APPARATUS
Filed June 7, 1962 3 Sheets-Sheet 1

INVENTOR.
ROBERT A. RIGHTMIRE
BY
Schramm, Kramor & Sturges
ATTORNEYS.

INVENTOR.
ROBERT A. RIGHTMIRE
BY
Schramm, Kramer & Sturges
ATTORNEYS.

United States Patent Office 3,288,641
Patented Nov. 29, 1966

3,288,641
ELECTRICAL ENERGY STORAGE APPARATUS
Robert A. Rightmire, Twinsburg, Ohio, assignor to The Standard Oil Company, Cleveland, Ohio, a corporation of Ohio
Filed June 7, 1962, Ser. No. 200,723
4 Claims. (Cl. 136—6)

This invention relates generally to the utilization of an electrostatic field across the interphase boundary between an electron conductor and an ion conductor to promote the storage of energy by ionic adsorption at the interphase boundary. Hence, this invention contemplates the disproportionation or displacement of the ions in a polar solution disposed between a pair of spaced electron conductors which provide electrical energy storage sites at the interphase boundaries between the electron conductors and the polar solution. This invention further contemplates enhancement of such energy storage by the cumulative utilization of reversible electrochemical reaction occurring at the interphase boundaries between the electron conductors and the polar solution. The principles of this invention for exemplary purposes will be described in reference to the displacement of solute ions in an aqueous medium, it being understood that these principles are applicable to other types of polar mediums as well.

Generally, conductors in which electrical charges are stationary as opposed to those in which the charges flow are said to be in an electrostatic condition. The charges in an electrically neutral conductor may be separated in several ways known to those skilled in the art including separation by induction from an adjacent charged body. For the purpose of this description, an ion conductor will be deemed the equivalent of an electron conductor with respect to its charged condition. Thus, the imposition of a charge is tantamount to the separation of electrons and positive centers in an electron conductor and to the separation of cations and anions in an ion conductor. The separation of cations and anions in an ion conductor may also include some polarization of ion-dipoles which are not completely dissociated in the polar solvent of the ion conductor. Compounds of polar molecules which are readily dissociated into ions in a solvent will be identified throughout as polar solutes. The interphase boundary between the electron and ion conductors will be referred to hereinafter as the interface. The ion conductor which is composed of the solvent and polar solute will also be referred to as the polar solution.

It is believed that when an electrical potential is applied across the interface between an electron conductor and an ion conductor there results an array of charged particles of ions and oriented or polarized dipoles. The resulting disposition of charges on the surface of the electron conductor at the interfaces and the adjacent array of ions and dipoles in the ion conductor has been termed the "double-layer." While this concept is theoretical and perhaps an over-simplification of a more complex arrangement of charged ions and dipoles, it nevertheless can serve as an exemplary diagrammatic basis for describing the method and apparatus of the present invention.

Those skilled in the art have long adhered to the proposition that a charge cannot be sustained in a closed cavity. Indeed, this proposition has led to the concept of the Faraday cage which has many useful applications in the electrical arts. However, we have found that this proposition does not apply when an electrical conductor is inserted into an otherwise enclosed cavity. This has enabled us to further enhance the ability to store electrical energy by utilizing porous electron conductors where the ion conductor penetrates the cavities formed by the pores. The effective surface area of the electron conductor is thus materially increased and, since the capacity of such a device is proportional to the effective surface area of the electron conductor, the capacity is also materially increased.

Consequently, the electron conductor is preferably in the form of a porous carbon electrode and the ion conductor may take the form of an aqueous sulphuric acid solution. Under the application of a suitable electrical potential, the electrode may be made to possess either a net positive or a net negative charge or no charge at all. The potential at which no net charge exists varies with the electrode material and with the nature and concentration of the polar solution. It is readily apparent that the electrode potential relative to that at which no net charge exists will determine whether the charge is positive or negative. There are applied electrical potential regions at which no steady state current will flow in the circuit. These potential regions correspond to the potential at which the polar solute will decompose or otherwise promote discharge of the solute ions at the respective interfaces. Hence, these potential regions will be hereinafter referred to as the decomposition potential for the particular polar solute. It is believed that between these two potentials the "double-layer" at the interface behaves like a capacitor of relatively high specific capacity which approximates the condition of a single parallel plate capacitor.

The amount of energy that may be drawn from such an apparatus can be further enhanced by providing a mechanism at the energy storage sites at each interface for promoting a reversible electrochemical reaction. Such a mechanism may include the provision at the energy storage sites of suitable activating chemical reagents which undergo electrochemical reconversion at the applied electrode potential. The decomposition potential of the activating chemical reagent for any given electrode must be less than or equal to the applied electrode potential to provide electrochemical reconversion of the corresponding reagent. On discharge, the chemical reagent will undergo a conversion which generates electrical energy in addition to that stored in the sites. The resultant electrochemical reaction product may then be reconverted to the reagent state by application of a suitable potential. The porous nature of the electrode again serves the purpose of supporting the chemical reagents on the effective electrode surface throughout the porous matrix. This permits the use of a very thin layer or coating of the chemical reagents since the products of their reaction are not as likely to separate or "flake-off" as in conventional storage cells. The very thin coating of chemical reagents in direct intimate contact with the effective surface of the electrode in turn minimizes the transit distance which must be traversed by the ions to release their charge and the resulting reduction in resistance further enhances the electrical storage capacity of the device.

The amount of energy that may be drawn from the apparatus will approach the cumulative total of the charge stored by adsorption of ions from the polar solution and energy generated by the corresponding electrochemical conversion of the activating chemical reagent at the particular electrodes.

In the annexed drawings:
FIG. 1 is a diagrammatic representation of the "double layer" effect.
FIG. 2 is a cross-sectional view of one form of electrical energy storage apparatus in accordance herewith.
FIG. 3 is an enlarged fragmentary cross-sectional view of an electrode useful in the apparatus of FIG. 2.
FIG. 4 is a cross-sectional view of another embodiment of electrical storage apparatus in accordance herewith.

Figure 1:
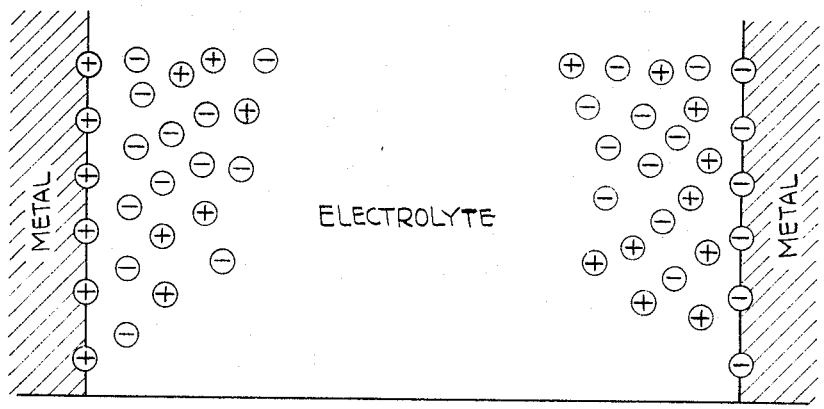

Briefly stated, then, there is provided in accordance with the present invention an electrical energy storage device employing a pair of spaced porous electron conductors, an ion-containing and conducting medium disposed in the space between the porous electron conductors and forming coacting interfaces therewith, respectively, and means electrostatically coacting between said porous electron conductors and said ion-containing and conducting medium to charge the medium and said electron conductors, respectively. In the preferred embodiment, the porous electron conducting members are formed from extremely finely divided particulate materials, e.g. Raney nickel, finely divided activated carbons, for example particulate carbon having a specific surface area in excess of 300 m.$^2$/cc., and especially specific surface area in the range of from 500 m.$^2$/cc. to 1500 m.$^2$/cc., said electrodes having a thickness no greater than about 0.125" per pole.

Further, in accordance with this invention, the high surface area porous electrodes may be provided with a microlayer of reactive components adapted to undergo electrochemical conversion in conjunction with the associated ion-containing and conducting medium. The micro-layer of reactive components is preferably disposed on the surface of the carbon particles on both the visible surfaces of the electrode and the surfaces internally of the electrode. A suitable reactant material is a substance which is capable of undergoing oxidation or reduction in response to the direction of flow of current, for example on charge and discharge, to yield stable reaction products, and which operate substantially in a reversible manner. A primary example of such a material is lead sulphate which may be reduced to lead, and the lead in turn oxidized ultimately to lead sulphate. Another such material is hydroquinone which undergoes reversible oxidation to quinone and reduction to hydroquinone which are, under the cell conditions, stable reactant products. The thickness of the layer of reactant materials coating the exposed surfaces of the particulate material forming the electrodes of the present invention is measured in terms of Angstroms and preferably approaches a mono-atomic layer. Electrodes having these characteristics may be produced by compressing to a physically rigid body an extremely finely divided particulate material such as carbon, or a Raney metal, e.g. Raney nickel, to form a porous structure having a void volume of from 25% to 60% impregnating the porous structure with a solution containing a reactive material, for example lead or hydroquinone, zinc, magnesium, lactic acid, etc., whereby the pores within the body of the compressed particulate material become saturated with the solution of the reactant material. Coconut charcoal having a specific surface of 800 m.$^2$/cc. is an especially useful electrode material since it is commercially available. The solvent has been removed by a simple drying procedure and the electrode is now in condition to be immersed and flooded with an ion-containing and conducting medium such as a water solution of an acid, base, or salt. In the preferred embodiment, it is desirable to impregnate the cathodes with one material (e.g. a lead compound) and the anodes with a different reactive material (e.g. an organic material such as hydroquinone).

Referring now more particularly to FIG. 1, there is here shown in diagrammatic form a representation of the "double layers" which are believed to exist at the interfaces of positively and negatively charged electrodes separated by an ion-transfer medium. At every interface, there is thought to exist an array of charged particles and oriented dipoles which is known as the "double layer." This layer arises from the fact that in general the two phases which form the interface are at different electrical potentials. In the present case, one phase is the electrode shown as metal in FIG. 1 and the other is a liquid ion-containing and conducting medium. At the negative electrode, the structure is believed to consist of a layer of electrons, a layer of adsorbed ions and a diffuse layer consisting of an ionic atmosphere in which the ions of one sign are in excess of their bulk concentration and those of the other sign are less than their bulk concentration. This atmosphere falls off rapidly, being generally much less than 100 Angstrom units thick. Also, at the interface, there may be a neutral molecule which may or may not be oriented.

As illustrated in FIG. 1, the electrodes have an excess of positive and negative charges, respectively. When the electrodes have equal amounts of both positive and negative charges, they have no net charge. The maximum electrode potential at which the electrode is charge-free is known as the potential of the electro-capillary maximum. This potential varies for different electrode materials and also depends on the nature and concentration of the ions in the ion-containing and conducting medium. This potential is of importance because of the fact that the electrode potential relative to that of the electro-capillary maximum determines whether positive or negative species are adsorbed, and whether ions or dipoles predominate at the electrode.

As above noted, there is a range of electrode potentials for which a current does not flow across the interface of the double layer. For example, when a platinum electrode is immersed in concentrated hydrochloric acid, this range varies from the positive electrode potential at which chlorine evolves and the negative potential at which hydrogen evolves. At intermediate potentials, no charging or discharging of ions is thermodynamically possible. In this range, ionic adsorption occurs as the double layer is charged. For every electron which flows onto the electrode, a positive ion must be adsorbed from the solution side. The interface is electrically similar to a capacitor of high specific capacity.

Figure 2:
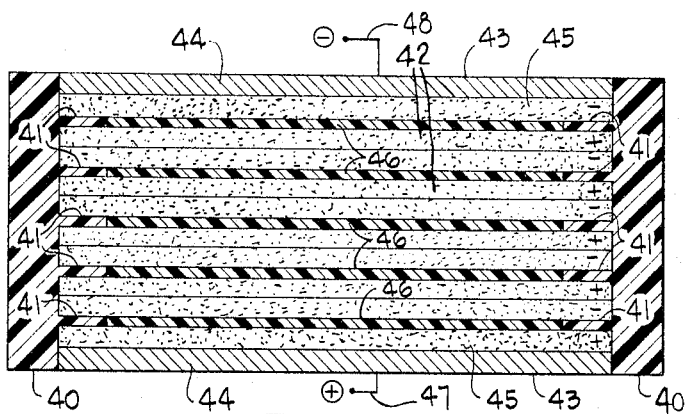
Figure 3:
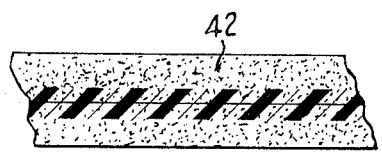

Referring now more particularly to FIGS. 2 and 3, there is shown one form of structure embodying the principles of the present invention and utilizing unimpregnated electrodes. Assuming circular electron conducting members, there is provided a cylindrical resinous body 40 having a plurality of circumferential grooves 41 therein. Grooves 41 are adapted to retain and maintain in spaced laminar relation electron conducting members 42 and terminal members 43. The terminal members 43 are composite electron conducting members composed of end plates 44 which serve to enclose a plurality of individual cell units. Adjacent the closing end plates 44 and in electron conducting contact therewith, there is provided a high surface area electron conducting member 45, hereinafter more particularly described.

Electron conducting members 42 are high surface area porous carbon electrode members having a composite structure such as that shown in FIG. 3. In a preferred embodiment, then, electron conducting members 42 are formed from a pair of porous carbon plates, preferably no more than one-eighth of an inch thick which have been cemented together with a suitable resinous material which will seal the pores, and adhere the plates together. During the cementing operation, sufficient pressure is applied to the interface between the plates to force the resinous material prior to setting into the pores and to establish carbon-to-carbon contact between the plates. In this way, the electron conducting members 42 become impervious to liquid, but permeable to an electric current by electronic conduction.

Disposed between the spaced electron conducting members 42, and between electron conducting members 42 and 43 at opposite ends of the pile, and in intimate contact with the confronting faces thereof is an ion-containing and conducting medium 46.

The ion-containing and conducting medium 46 may be an aqueous solution of a salt, acid, or base disposed as a free liquid in the space between the aforesaid electron conducting members or supported on an inert porous matrix such as alundum, porous clay, filter paper, or the like. Alternatively, and preferably, the ion-containing and conducting medium is an ion exchange resin which is saturated with an aqueous medium, e.g. water.

End plate 44 may be formed of any convenient material, e.g. stainless steel, and provided with suitable leads 48 and 49 for attachment to a direct current source, not shown, for charging the apparatus. From these leads 48 and 49 power may be withdrawn from the apparatus by connecting such leads to a load, for example an electrical motor.

Ion-permeable membranes of the type which are employed in the apparatus of the present invention may be defined as those membranes which are electrically conductive and permeable to ions, but which are not permeable to large non-ionic molecules. The more sophisticated ion-permeable membranes are known as permselective membranes, i.e. they are permeable to ions of a given charge but not ions having the opposite charge. Hence, they are referred to as cationic or anionic as the case may be, and both types are useful in connection with this invention.

The preparation and description of the permselective membranes is well known in the art and there are numerous patents relating to such membranes. Examples of such membranes are described in U.S. Patents 2,636,851; 2,636,852; 2,681,319; 2,681,320; 2,702,272; 2,730,768; 2,731,411; 2,731,435; 2,731,408; 2,732,351; 2,756,202; 2,780,604; 2,800,445; 2,820,756; 2,827,426; 2,860,096; 2,860,097; 2,867,575; 2,894,289; 2,903,406; 2,858,264; 2,957,206. Suitable membranes may be selected from those disclosed in the patents in the foregoing list to carry out the present invention. The durability of the membranes will vary depending upon their chemical composition, but this affects only the length of time which will transpire before replacement is necessary.

One suitable membrane of the cation exchange type may be prepared in the following manner:

A mixture of about 95 parts by weight of styrene and about 5 parts by weight of divinyl benzene was polymerized. The resulting polymer was comminuted to fine particles and 100 parts by weight of this finely-divided material was sulphonated by reaction with about 175 parts by weight of chlorosulphonic acid. The latter reaction was carried out by heating at reflux temperature for about 3 minutes and then maintaining the mixture at room temperature for 50 hours. The sulphonated product was then washed in an excess of water to remove any remaining chlorosulphonic acid and any acid chlorides which were formed in the reaction. The sulphonated resin was then dried and 2 parts by weight of the dried resin were mixed with 1 part by weight of polyethylene and the resulting mixture was pressed into a sheet which then serves as the membrane.

Figure 4:
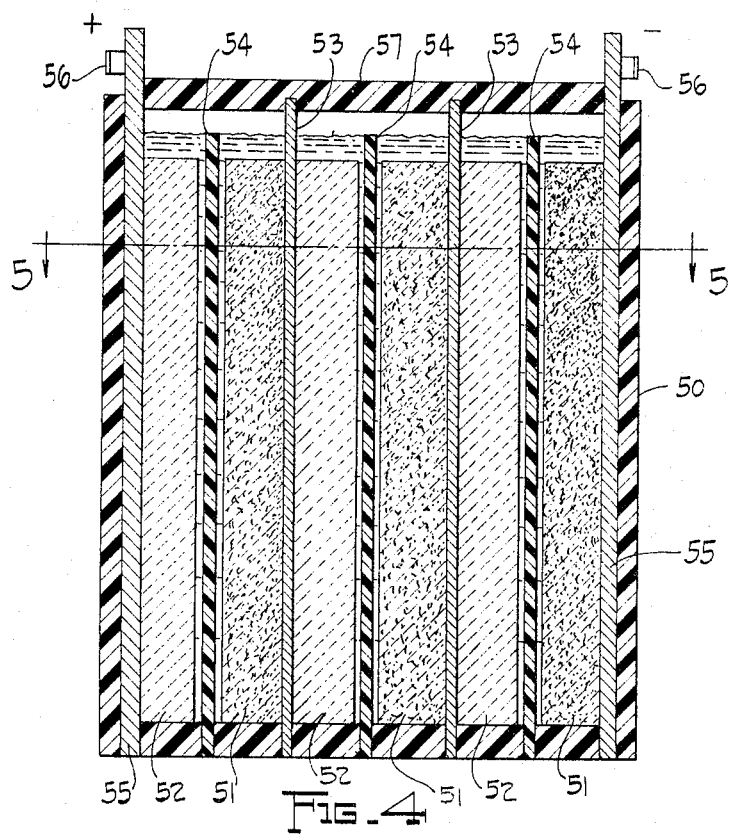
Figure 5:
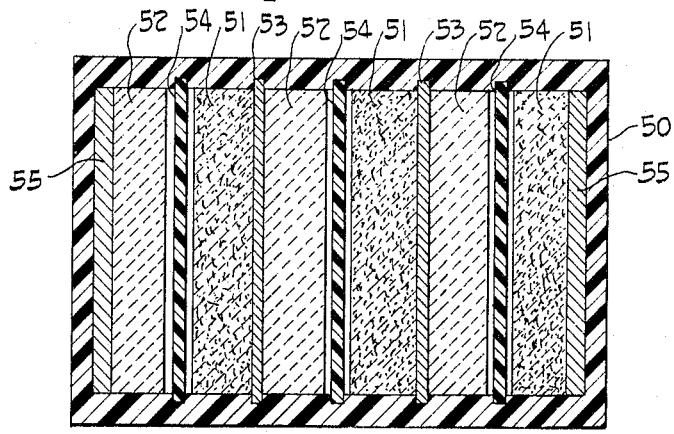
FIG. 5 is a cross-sectional view taken on the line 5—5 of FIG. 4.

FIG. 4 in the annexed drawings is a cross-sectional view of a preferred embodiment of the present invention utilizing impregnated electrode members for enhanced energy storage. FIG. 5 is a cross-sectional view of the embodiment shown in FIG. 4 taken on the line 5—5 thereof. In FIGS. 4 and 5, then, there is shown a battery case 50 which may be formed of any convenient non-conducting material such as hard rubber, plastic, glass, or the like. In the embodiment shown in FIGS. 4 and 5, the battery case 50 is conveniently formed of a conventional epoxy resin reinforced with glass fibers and having a thickness of about ⅜″. Disposed within the battery case 50 are a plurality of cathodes 51 in alternating and spaced relationship with respect to an equal number of anodes 52. In the preferred embodiment shown, the anodes and cathodes are formed from an activated carbon such as carbon black by a conventional pressing technique to form electrode members approximately ¼″ thick. The cathodes 51 differ from the anodes 52 in that they are impregnated with a lead salt such as lead acetate or lead nitrate to form a very thin coating of lead or bi-valent lead on the particles thereof and the latter are impregnated with lactic acid to form a mono-layer on the particles thereof. Each anode-cathode pair constitutes a single cell unit, there being three such cell units shown in FIGS. 4 and 5.

Each cell unit is separated from the adjacent cell unit by a lead foil cell separator 53. The electrodes of each cell unit are in turn separated by a porous battery spacer 54. In the preferred embodiment shown in FIGS. 4 and 5, battery spacer 54 is a micro-porous polyvinyl chloride material 50 mils thick. The lead foil cell separators 53 are conveniently 8 mils thick and in electrical contact with the adjacent electrodes 51 and 52. In the arrangement shown in FIGS. 4 and 5, the cell units are effectively connected in series, and the terminal electrodes are provided with current collectors 55, these being any suitable means for conveying electrons to an external circuit, not shown. In the embodiment shown in FIGS. 4 and 5, current collectors 55 are conveniently lead-coated copper sheets in intimate contact with the respective anode 52 and cathode 51 in the terminal cell unit. Collectors 55 are conveniently provided with external wire connectors 56 for attaching the device to an external circuit. The battery is provided with a plastic cover conveniently adapted to engage the cell spacers. In the embodiment shown in FIG. 4, the battery cover is conveniently a "Lucite" plastic cover. The cell constructed in accordance with the structure shown in FIGS. 4 and 5 and utilizing the preferred materials indicated above with an electrolyte composed of 9 molar sulphuric acid in water has a ratio of the limiting diffusional current to the maximum ohmic current which is greater than 1.

The porous electron conducting members of the present invention are preferably formed from very high surface area carbon which has been subjected to specialized pretreatment with reactive components in accordance with this invention. Such carbons as have been treated with metals, for example nickel, platinum, palladium, metal oxides such as nickel oxide, lead oxide, metal chlorides such as aluminum chloride, zinc chloride, lead chloride, nickel chloride, etc. or metal bromides such as aluminum bromide, are far superior to untreated carbon. As a result of such treatment, the reactive material is maintained within the internal structure of the electrodes within a few Angstrom units of a reactant adsorbing surface. Consequently, the charge and discharge rates are not limited by concentration polarization and very rapid charge rates of less than six minutes have been obtained as compared to hours for conventional electrical storage devices.

Figure 6:
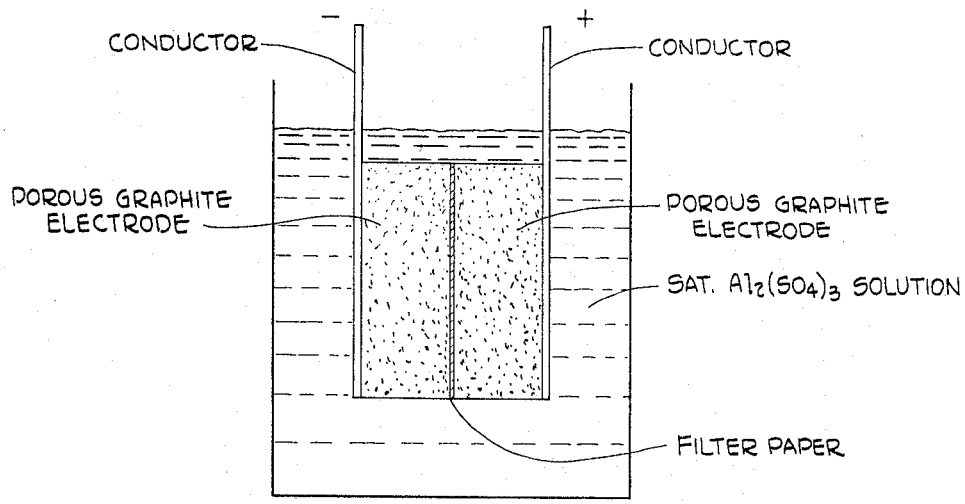
FIG. 6 is a diagrammatic illustration of a storage device utilizing a filter paper separator between the electrodes.
Figure 7:
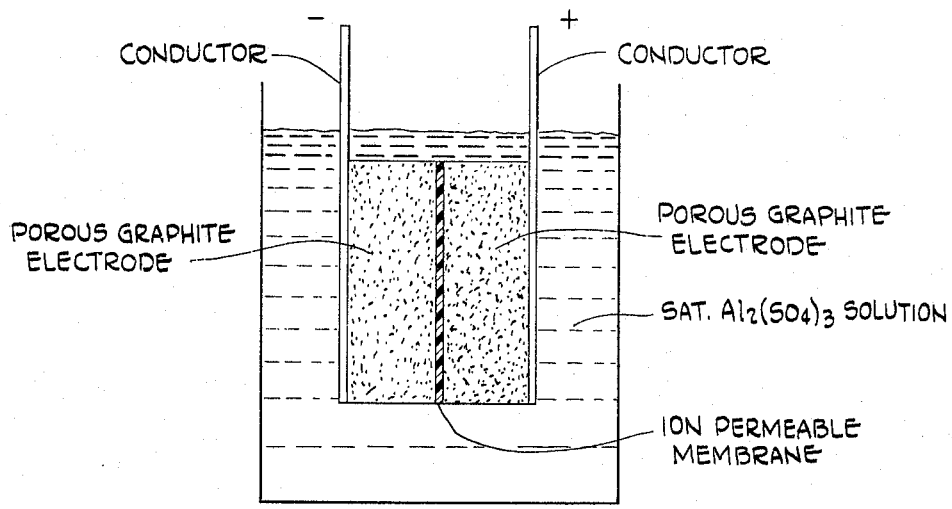
FIG. 7 is a diagrammatic illustration of a storage device similar to that shown in FIG. 6 utilizing an ion exchange membrane as a separator.

A preferred treatment is to soak a high surface area carbon electrode (such as formed by pressing carbon black or coconut charcoal (800 m.$^2$/cc.) under high pressure into a plate no more than about one-eighth of an inch thick) with a saturated solution of lead acetate. Another method of pretreating the electron conducting members of the present invention contemplates boiling compressed carbon blocks in concentrated nitric acid for a period of eight hours, followed by washing with distilled water for a period of 1 week. Thereafter, the washed carbon blocks may be boiled in a saturated aluminum sulphate solution for a period of 10 hours. As thus produced, the treated carbon blocks are utilized as cathodes in the construction of a cell such as shown in FIGS. 6 and 7. Anodes of similar carbon structure, and impregnated or not as above indicated, are likewise prepared and installed. The ion-containing and conducting medium is composed of a filter paper separator as shown in FIG.

6 saturated with a 6 normal aluminum sulphate aqueous solution containing a small percentage of sulphuric acid (2%). Alternatively, an ion exchange separator, saturated with water, may be used as shown in FIG. 7. Essentially all of the electrolyte is contained within the structures of the porous electrodes, and an immobile reversible redox system may be contained in the internal structure of the very high surface area electrode material either as an insoluble surface treatment (metal, oxide, insoluble salt) or as soluble redox polymers which do not pass through the separator. Several examples of such systems are: silver chloride/silver; cadmium/cadmium hydroxide; quinone/polymeric hydroquinone; lactic acid/pyruvic acid.

Frequently it is desirable to include in the impregnant composition a material which may be co-deposited with the reactive material and which acts as a catalyst for the reaction. Platinum is such a material and coacts well with the organic couples, particularly the lactic acid. The catalyst may be co-deposited from a solution including platinum chloride.

The redox couples desired for use in accordance herewith in conjunction with either or both of the electrodes are those which exhibit a high degree or extent of reversible reaction, e.g. 90% or higher, with a small change in voltage, e.g. .1 to 1 volt. Catalysts, e.g. platinum, palladium, nickel, vanadium, etc., are especially useful to aid in the reversible reactions.

By high surface area electrodes or electron conducting members, we mean those having a specific surface area of 300 to 1500 or more square meters per cubic cm. of electrode. Any conducting material which meets these surface area requirements may be used, but preferably compacted particulate activated carbon is employed. The electron conducting members should preferably not be more than one-eighth of an inch thick if the electrolyte contacts both sides. This limitation on thickness is significant whereas length and width are not. The thinner the electrodes, the better, and electrodes .001" thick have been made in accordance herewith. With very thin separators, e.g. .001", large capacity in a small volume may be secured. The electrolyte should have a conductivity that exceeds 5 ohm-centimeters.

The electrochemical energy storage devices of the present invention have a high capacity and a non-linear response which yields higher average voltages per electron during discharge. They can be fully charged and fully discharged in not over 10 minutes and preferably not over 5 minutes. These devices have a storage capacity of at least 4 watt hours per pound, and more usually 10 watt hours per pound. One of the unusual properties of the electrochemical energy storage devices of the present invention is that the discharge rate is not as temperature dependent as is a lead-acid storage battery in which the discharge rate is a function of temperature. Furthermore, the devices of the present invention are lightweight and inexpensive to operate and have an apparently unlimited life because the reactive components occupy only a micro-layer on the electrode surface and do not readily flake off.

In order to illustrate a practical application of a cell produced in accordance herewith, lead acetate may be used as an impregnating agent for the negative electrode. The electrodes are carbon electrodes pressed from carbon black to plates about one eighth of an inch thick. An electrode characterized by micro-pore structure (e.g. 10 A. to 200 A.) is essential, and activated carbon black of 600 m.²/cc. area is thus useful. While any lead salt may be used for the impregnation step which salt is soluble in a suitable solvent, e.g. water, we prefer to use lead acetate (200 g.:100 cc. H$_2$O) because the acetate group has a very satisfactory affinity for carbon. Lead nitrate may also be used. Following the immersion of electrode in a saturated lead acetate solution, the impregnated electrode is treated with a cold 6 molar aqueous sulphuric acid solution following which the lead acetate is electrochemically reduced to a lead containing coating of atomic thickness wherein the lead has a valence of 0 or +2. Because of the pore size of the carbon electrode, the diffusion path has a magnitude of less than 10 A.

The electric energy storage devices hereof are readily recharged in a matter of a few minutes, i.e., less than about 10 minutes. For example, a lead sulphate/lead cell utilizing impregnated cathodes as above described and hydroquinone impregnated anodes can be fully recharged to a capacity of about 8 watt hours per pound in 3-4 minutes at a level of 2 volts.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In an electrical energy storage device for storing energy in electrostatic condition as double layers of electron—ions and proton—ions at coacting interfaces, the combination of a pair of spaced, porous electrodes, one positive and one negative, each electrode comprising finely divided conductive carbon, having a specific surface area of at least 300 m.²/cc., and having a void volume in the range of about 25 percent to 60 percent, the positive electrode having a micro layer of an active material on the surface and within the pores of said carbon, said positive electrode having a micro layer selected from the group consisting of nickel, platinum, palladium and silver, the negative electrode having a micro layer of an active material on the surface and within the pores of said carbon, said negative electrode micro layer being selected from the group consisting of cadmium hydroxide and zinc oxide, said electrodes having a thickness in the range of 0.001 inch to 0.125 inch, a separator between said electrodes having a thickness of about 0.001 inch, the pores of said electrodes having a magnitude within the range of about 10 to 200 angstroms, an ion-containing and conducting medium being selected from the group consisting of potassium hydroxide and sodium hydroxide, said conducting medium in contact with both sides of both electrodes and having a conductivity that exceeds about 5 ohm-centimeters and said conducting medium forming interfaces with said electrodes, and means for applying an electrical potential across said electrodes to electrostatically form a double layer at each interface, respectively.

2. In an electrical energy storage device for storing energy in electrostatic condition as double layers of electron—ions and proton—ions at coacting interfaces, the combination of a pair of spaced, porous electrodes, one positive and one negative, each electrode comprising finely divided conductive carbon, having a specific surface area of at least 300 m.²/cc., and having a void volume in the range of about 25 percent to 60 percent, the positive electrode having a micro layer of an active material on the surface and within the pores of said carbon, said negative electrode micro layer being selected from the group consisting of hydroquinone, nickel, platinum and palladium, the negative electrode having a micro layer of an active material on the surface and within the pores of said carbon, said positive electrode micro layer being lead oxide, said electrodes having a thickness in the range of 0.001 inch to 0.125 inch, a separator between said electrodes having a thickness of about 0.001 inch, the pores of said electrodes having a magnitude within the range of about 10 to 200 angstroms, an ion-containing and conducting medium of sulfuric acid, said conducting medium in contact with both sides of both electrodes and having a conductivity that exceeds about 5 ohm-centimeters and said conducting medium forming interfaces with said electrodes, and means for applying an electrical potential across said electrodes to electrostatically form a double layer at each interface, respectively.

3. In an electrical energy storage device for storing energy in electrostatic condition as double layers of electron—ions and proton—ions at coacting interfaces, the combination of a pair of spaced, porous electrodes, one positive and one negative, each electrode comprising finely divided conductive carbon, having a specific surface area of at least 300 m.$^2$/cc., and having a void volume in the range of about 25 percent to 60 percent, the positive electrode having a micro layer of an active material on the surface and within the pores of said carbon, said negative electrode micro layer being lead the negative electrode having a micro layer of an active material on the surface and within the pores of said carbon, said negative electrode micro layer being lead chloride, said electrodes having a thickness in the range of 0.001 inch to 0.125 inch, a separator between said electrodes having a thickness of about 0.001 inch, the pores of said electrodes having a magnitude within the range of between about 10 to 200 angstroms, an ion-containing and conducting medium of hydrochloric acid, said conducting medium in contact with both sides of both electrodes and having a conductivity that exceeds about 5 ohm-centimeters and said conducting medium forming interfaces with said electrodes, and means for applying an electrical potential across said electrodes to electrostatically form a double layer at each interface, respectively.

4. In an electrical energy storage device for storing energy in electrostatic condition as double layers of electron—ions and proton—ions at coacting interfaces, the combination of, a pair of spaced, porous electrodes, one positive and one negative, each electrode comprising finely divided conductive carbon, having a specific surface area of at least 300 m.$^2$/cc., and having a void volume in the range of about 25 percent to about 60 percent, the positive electrode having a micro layer of lead oxide active material on the surface and within the pores of said carbon, and the negative electrode having a micro layer of hydroquinone active material on the surface and within the pores of said carbon, said electrodes having a thickness in the range of about 0.001 inch to 0.125 inch, a separator between said electrodes having a thickness of about 0.001 inch, the pores of said electrodes having a magnitude within the range of about 10 to 200 angstroms, an ion-containing and conducting medium consisting essentially of sulfuric acid, said conducting medium in contact with both sides of both electrodes and having a conductivity that exceeds about 5 ohm-centimeters, and said conducting medium forming interfaces with said electrodes, and means for applying an electrical potential across said electrodes to electrostatically form a double layer at each interface, respectively.

References Cited by the Examiner

UNITED STATES PATENTS

| | | | |
|---|---|---|---|
| 2,658,099 | 11/1953 | Basset | 136—22 X |
| 2,786,088 | 3/1957 | Robinson | 136—86 |
| 2,831,045 | 4/1958 | Harding | 136—83 |
| 2,856,446 | 10/1958 | McCallum | 136—26 |
| 3,141,795 | 7/1964 | Eisler | 136—26 X |

WINSTON A. DOUGLAS, *Primary Examiner.*

MURRAY TILLMAN, ALLEN B. CURTIS, *Examiners.*

B. J. OHLENDORF, *Assistant Examiner.*

UNITED STATES PATENT OFFICE
CERTIFICATE OF CORRECTION

Patent No. 3,288,641                                November 29, 1966

Robert A. Rightmire

It is hereby certified that error appears in the above numbered patent requiring correction and that the said Letters Patent should read as corrected below.

Column 9, line 15, for "negative" read -- positive --; same line 15, for "lead" read -- silver --.

Signed and sealed this 12th day of September 1967.

(SEAL)
Attest:

ERNEST W. SWIDER                                EDWARD J. BRENNER
Attesting Officer                                    Commissioner of Patents